US00RE34809E

United States Patent [19]

Idei

[11] E Patent Number: Re. 34,809

[45] Reissued Date of Patent: Dec. 27, 1994

[54] COLOR VIDEO SIGNAL SYNTHESIZER

[75] Inventor: Toshio Idei, Nagaokyo, Japan

[73] Assignee: Mitsubishi Denki Kabushiki Kaisha, Tokyo, Japan

[21] Appl. No.: 862,501

[22] Filed: Apr. 2, 1992

Related U.S. Patent Documents

Reissue of:

[64] Patent No.: 4,914,509
Issued: Apr. 3, 1990
Appl. No.: 163,540
Filed: Mar. 3, 1988

[30] Foreign Application Priority Data

| | | | |
|---|---|---|---|
| Mar. 3, 1987 | [JP] | Japan | 62-49408 |
| Mar. 3, 1987 | [JP] | Japan | 62-49409 |
| Mar. 3, 1987 | [JP] | Japan | 62-49410 |
| May 21, 1987 | [JP] | Japan | 62-126660 |

[51] Int. Cl.[5] ..... H04N 5/45

[52] U.S. Cl. ..... 348/565; 348/566

[58] Field of Search ..... 358/22, 183, 182, 181, 358/30, 31; 348/565, 566; H04N 5/45

[56] References Cited

U.S. PATENT DOCUMENTS

| | | | |
|---|---|---|---|
| 4,238,773 | 12/1980 | Tsuboku et al. | 358/183 |
| 4,712,130 | 12/1987 | Casey | 358/22 |
| 4,761,688 | 8/1988 | Hakamada | 358/183 |
| 4,811,085 | 3/1989 | Idei | 358/22 |

FOREIGN PATENT DOCUMENTS

| | | | |
|---|---|---|---|
| 55-18125 | 2/1980 | Japan . | |
| 56-2821 | 1/1981 | Japan . | |
| 56-48783 | 5/1981 | Japan . | |
| 0059679 | 4/1983 | Japan | 358/212 |

*Primary Examiner*—Victor R. Kostak

[57] ABSTRACT

A video signal synthesizer operable to provide a multiplex video signal for producing a picture-in-picture effect on a display screen of a display device, for example, a cathode ray tube. The video signal synthesizer utilizes a PLL (phase-locked loop) circuit to generate a carrier signal synchronized with a color burst signal contained in the composite video signal for the reproduction of the main picture. The carrier signal is first delayed by a delay circuit and then utilized to remodulate the sub-picture signal which has been compressed with respect to time. This remodulated sub-picture signal is then subjected to time-division multiplexing through analog switch assembly. The delay time of the delay circuit is set so that both color subcarrier signals of the main picture and sub-picture signals may be matched in phase. Hence, the time-division multiplexing of the main picture signal and the sub-picture signal is possible without altering the characteristics of the color composite video signal. Thus, the necessity of the main picture signal being demodulated and modulated can be obviated.

17 Claims, 6 Drawing Sheets

Fig. 5 Priorior Art

COLOR VIDEO SIGNAL SYNTHESIZER

Matter enclosed in heavy brackets [ ] appears in the original patent but forms no part of this reissue specification; matter printed in italics indicates the additions made by reissue.

BACKGROUND OF THE INVENTION

1. Field of Technology

This invention relates to a device for obtaining a synthetic composite video signal to reproduce a so-called picture-in-picture being inserted into a main picture on a screen of a display device such as a cathode ray tube, using one of the plural composite video signals entered simultaneously as a main picture and the remaining as reduced sub-picture(s).

2. Description of the Prior Art

FIG. 5 is a block diagram of a conventional video signal synthesizer, in which there is only one sub-picture.

In FIG. 5, reference numeral (11) represents a first input terminal in which a first composite video signal for a main picture (hereinafter called main picture signal) (1) is entered: (12) is a first YC separator; (13) is a first chroma demodulator; (14) is a first sync signal separator; (15) is a second input terminal in which a second composite video signal for a sub-picture (hereinafter called sub-picture signal (2) is entered. The main picture is reproduced on a full screen of a display device and the sub-picture is reproduced within the framework of, and in superimposed relationship with, the main picture on the same screen. The other components consist of the following: (17) is a second chroma demodulator; (18) is a second sync signal separator; (19), (20), (21) are first, second, third AD converters; (22), (23); (24) are first, second, third digital memories capable of writing and reading simultaneously and in asynchronous timing mutually; (25), (26), (27) are first, second, third DA converters; (28) is an analog switch; (29) is a chroma modulator; (30) is a YC adder, (31) is an output end; and (32), (33) are first and second digital signal processing system controllers.

Referring now to operation, the main picture signal (1) entering from the first input terminal (11) is separated into a first luminance signal (34) and a first color subcarrier signal (35) by means of the first YC separator (12). The first color subcarrier signal (35) is then demodulated into a first red color difference signal (36) and a first blue color difference signal (37) by the first chroma demodulator (13).

Further, the sub-picture signal (2) entering from the second input terminal (15) is separated into a second luminance signal (38) and a second color subcarrier signal (39) by the second YC separator (16). The second color subcarrier signal (39) is then demodulated into a second red color difference signal (40) and a second blue color difference signal (41) by the second chroma demodulator (17).

The first, second, third AD converters (19), (20), (21) convert the second luminance signal (38), second red color difference signal (40) and second blue color difference signal (41) into digital signals respectively. These digital signals are then written into the first, second, third digital memories (22), (23), (24). At this time, first and second control signals (42), (43), necessary for writing control are generated by the first digital signal processing system controller (32). Their timings are then synchronized with the sync signal (44) separated by the second sync signal separator (18), that is, the sub-picture signal (2).

Next, when reading out the contents from the first, second and third digital memories (22), (23), (24), the sub-picture is reduced, that is, compressed in the time direction. The compression in the time direction is realized by scanning, when reading out, the contents in the digital memories (22), (23), (24) at a speed of K times (K is greater than 1) the writing-in speed. As a result digital signals compressed to 1/K in the time direction are obtained. These time-compressed digital signals are converted into analog signals by the first, second and third DA converters (25), (26), (27). Through this digital signal processing system, the second luminance signal (38), the second red color difference signal (40) and the second blue color difference signal (41) are respectively time-compressed to become a third luminance signal (45), a third red color difference signal (46) and a third blue color difference signal (47), respectively.

Here, third and fourth control signal (48), (49) necessary for reading out, are generated by the second digital signal processing system controller (33). Their timings are then synchronized with the sync signal (50) separated by the first sync signal separator (14), that is, the main picture signal (1), and the obtained third luminance signal (45), the third red color difference signal (46) and the third blue color difference signal (47) are, as a matter of fact, synthesized with the main picture signal (1).

The analog switch (28), with three switching circuit systems for luminance signal and two color difference signals, is used in the time-division multiplexing of the main picture signal and the time-compressed sub-picture signal. The changeover signal (51) of this analog switch (28) is given in the timing synchronized with the main picture signal (1). Since the output signals from the analog switch (28) are separated into the luminance signal, red color difference signal and blue color difference signal, the latter two signals are modulated into a color signal in the chroma modulator (29). It is then summed up with the luminance signal by the adder (30), and an intended synthetic composite video signal (3) is obtained at the output terminal (31).

Since the conventional video signal synthesizer is thus composed, the main picture signal (1), which does not particularly require to be time-compressed is also demodulated and modulated. This caused a deterioration of picture quality of the main picture.

Further, the analog switch with three switching circuit systems is required for time-division multiplexing, which causes the cost to increase when the number of sub-pictures is increased.

Moreover, since the sync signal and color subcarrier signal of the sub-picture are generated on the basis of the sync signal and color subcarrier signal of the main picture, if the main picture signal is missing, then the reduced sub-picture signal is not delivered, either. Accordingly, when editing while simultaneously monitoring the main and sub-pictures, the editing job was disabled in such a case.

Incidentally, a similar video signal synthesizer of this kind, the apparatus in the Japanese Laid-open Patent Publication No. 56-48783 published on May 2, 1981 is known. In this apparatus, in order to prevent color deviation due to delay time difference between the luminance signal and the color difference signal of the reduced sub-picture signal, the delay time difference was corrected by adjusting the timing of writing the luminance signal and the color difference signal into the memory, or the timing of reading out thereof. As shown in FIG. 9 of the same publication it is similar to the prior art described above in that the main picture signal is separated into the luminance signal and the color difference signals which are then synthesized in the main/sub selector circuit.

SUMMARY OF THE INVENTION

It is hence a primary object of this invention to present a video signal synthesizer capable of reducing the cost by using a time-division multiplexing means, for example, an analog switch, with single switching circuit system regardless of the number of sub-pictures, without deteriorating the quality of the main picture.

It is another object of this invention to present a video signal synthesizer capable of obtaining a reduced sub-picture signal free from disturbance in synchronization and color phase even if the main picture signal is missing.

A video signal synthesizer according to a preferred embodiment of this invention comprises: means for generating first and second carrier signals having a mutual phase difference of 90 degrees being synchronized with a burst signal extracted from a main picture signal; reduced sub-picture signal producing means for producing a reduced sub-picture signal by separating a sub-picture signal into a luminance signal; color difference signals and time-compressing them by means of digital memory; and summing up the reduced luminance signal and the reduced color difference signals obtained by chroma modulation by said first and second carrier signals; and means for controlling the phases of said first and second carrier signals so that the phase of the color signal of this reduced picture signal and the phase of said main picture signal may be matched. Accordingly, the main picture signal does not undergo demodulation nor modulation. By means of analog switch with single switching circuit system in the number of input terminals corresponding to the number of pictures to be synthesized or reproduced on one display screen, a synthetic composite video signal, free from color deviation between the main picture and the reduced sub-picture, may be obtained.

Since the synthetic composite video signal is obtained by synthesizing, in time division, the main picture signal and reduced sub-picture signal by analog switch with single switching system, that is a switching system only for a composite video signal, the composition of the analog switch is simple.

A video signal synthesizer, in other preferably embodiment of this invention, comprises means for controlling the phases of the first and second carrier signal so as to be synchronized with the first carrier signal in order to further reduce the color deviation between the main picture and the reduced sub-picture.

A video signal synthesizer, in a further preferred embodiment of this invention comprises means for detecting an absence of the main picture signal, in which when the absence of the main picture signal is detected, it is changed over to a sync signal generated in a built-in sync signal generator circuit. This is done to continue action of the reduced sub-picture signal and the driving of analog switch for synthesis of picture signal. Further the control voltage of a voltage-controlled oscillator circuit, for generating a carrier signal used in chroma modulation of reduced sub-picture signal, is changed over so as to enter from a preliminary disposed power source. This is done so that the reduced sub-picture may be produced successively when the main picture signal is missing.

BRIEF DESCRIPTION OF THE DRAWINGS

The present invention will become more clearly understood from the following description of a preferred embodiment, when taken in conjunction with the accompanying drawings. However, the embodiment and the accompanying drawings are given only for the purpose of illustration and explanation, and are not to be taken as being limitative of the present invention in any way whatsoever, whose scope is to be determined solely by the appended claims. In the accompanying drawings, like reference numeral denote like parts in the several views, and:

DETAILED DESCRIPTION OF THE EMBODIMENT

Before the detailed description of the present invention is discussed, it is to be noted that like circuit components of the prior art system, which are also used in the system of the present invention, will not be discussed in detail for the sake of brevity.

Figure 2:
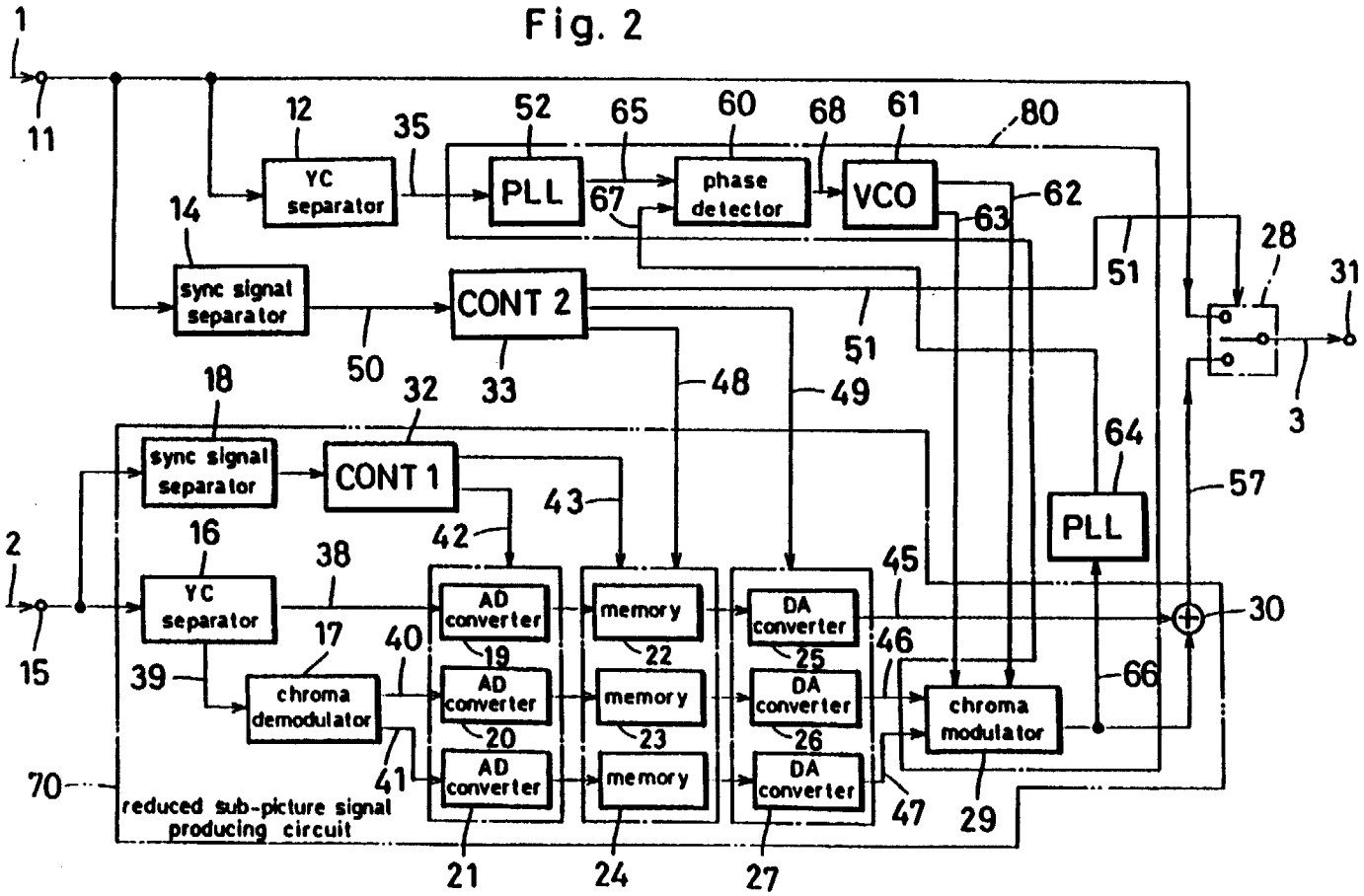
FIG. 2 and FIG. 3 are block diagrams showing embodiments having one type and another type of a phase-locked loop circuit respectively.

FIG. 2 shows a block circuit diagram of a first embodiment of this invention. In the drawing, reference numeral (52) represents a phase-locked loop circuit (hereinafter called PLL circuit), (53) is a first delay circuit, (54) is a second delay circuit, (55), (56) are first and second carrier signals generated in the PLL (52), and (70) is a reduced sub-picture signal producing circuit. The circuit is composed of a second YC separator (16), a second chroma demodulator (17), a second sync separator (28), AD converters (19), (20), (21), digital memories (22), (23), (24), DA converters (25), (26), (27), a chroma modulator (29), an adder (30), and first digital processing system controller (32). Numeral (57) denotes a third composite video signal representing the time-compressed sub-picture (hereinafter called reduced sub-picture signal).

Its operation is as follows.

The PLL circuit (52) is synchronized in phase with the color burst signal contained in a first color subcarrier signal (35) separated by the first YC separator (12), and generates first and second carrier signals (55), (56) having a mutual phase difference of 90 degrees. The first and second carrier signal (55), (56) are delayed by the predetermined time respectively by the first and second delay circuits (53), (54) to become first and second delayed carrier signals (58), (59). They are then fed into the chroma modulator (29), and converted into a third color subcarrier signal (66) by a time-compressed third red color difference signal (46) and a time-compressed third blue color difference signal (47). It is then summed up with a time-compressed third luminance signal (45) by the adder (30) to become a reduced sub-picture signal (57). Then it is time-division multiplexed with the main picture signal (1) in the analog switch (28) to become a synthetic composite video signal (3). This signal is outputted from the output terminal (31).

Meanwhile, the delay time in the first and second delay circuits (53), (54) is set at a value so that the color burst signal of the main picture signal (1) and the color burst signal of the reduced sub-picture signal (57) may be matched in phase.

Thus, in this embodiment, since the main picture signal is not subjected to demodulation or modulation, the picture quality is not deteriorated, and the phase matching of main picture and sub-picture is done automatically. Further, since time-division multiplexing is carried out in the state of composite video signal having a luminance signal and color difference signals, it is possible to multiplex by an analog switch with single switching system, that is a switching system only for composite video signal, regardless of the number of sub-pictures. Therefore, a video signal synthesizer of high picture quality and low price can be obtained.

A second embodiment of this invention is described below.

Figure 1:
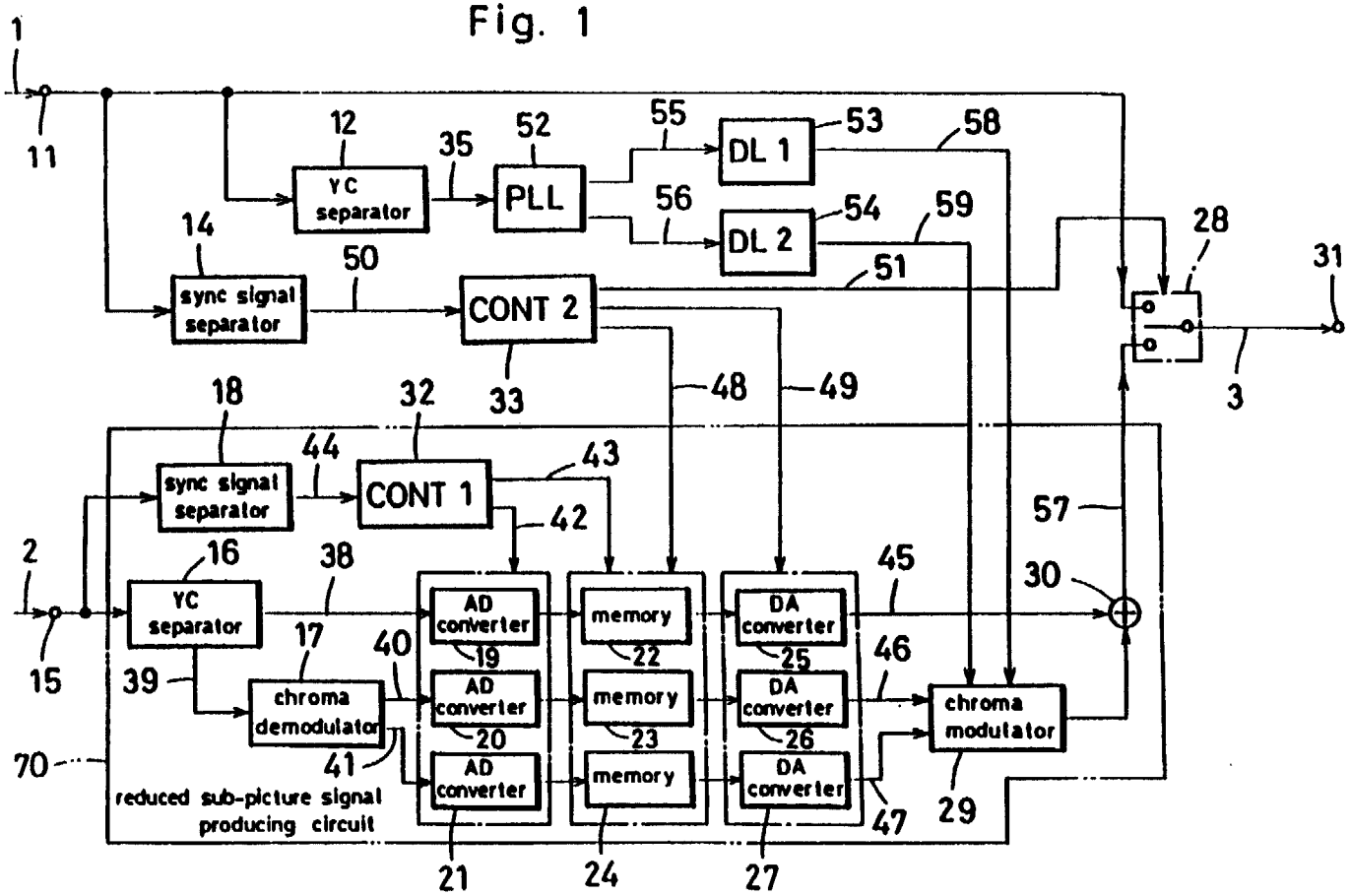
FIG. 1 is a block diagram showing the composition of an embodiment of this invention.

FIG. 2 is a block diagram of this embodiment, in which the same reference numbers as in FIG. 1 denote same or corresponding parts. In this drawing, numeral (52) is a first phase-locked loop circuit (hereinafter called first PLL circuit), (60) is a phase detector, (61) is a voltage-controlled oscillator (VCO), (62), (63) are first and second carrier signals generated by the VCO (61) for chroma modulation, and (64) is a second phase-locked loop circuit (second PLL circuit).

Its operation is as follows.

The first PLL circuit generates a first continuous wave signal (65) which is synchronized in phase with the color burst signal contained in the first color subcarrier signal (35) separated by the first YC separator (12). The second PLL circuit (64) generates a second continuous wave signal (67) which is synchronized in phase with the color burst signal contained in the third color subcarrier signal (66) generated by the chroma modulator (29). The phase detector (60), comparing the phases of the first and second continuous wave signals (65), (67), generates a voltage signal or a phase difference signal (68) based on the phase difference of the two. The VCO (61) generates continuous first and second carrier signals (62), (63) being controlled in the direction of the oscillation frequency and phase approaching the first continuous wave signal (65) by the voltage signal (68) entered from the phase detector (60), and having a mutual phase difference of 90 degrees. The first and second carrier signals (62), (63) are fed into the choma modulator (29), and the time-compressed third and color difference signal (46) and the time-compressed third blue color difference signal (47) are modulated into a third color subcarrier signal (66). This color subcarrier signal (66) and the time-compressed third luminance signal (45) are summed up by the adder (30) to become a reduced sub-picture signal (57). It is subjected to time-division multiplexing with the main picture signal (1) in the analog switch (28) to become a synthetic composite video signal (3), which is delivered from the output terminal (31).

In this composition, the circuit (80) circulating signals through the first and second PLL circuits (52), (64), phase detector (60), VCO (61) and the chroma modulator (29) forms one phase-locked loop circuit. Therefore it is automatically adjusted so that the frequency and phase of the color burst signal contained in the color subcarrier signal (66) modulated in the chroma modulator (29), may be constantly matached with the frequency and phase of the color burst signal contained in the color subcarrier signal (35) of the main picture signal (1).

Accordingly, since the main picture signal (1) and reduced sub-picture signal (57) are matched in the frequency and phase of their color subcarrier signal, color phase matching of the synthetic picture may be done automatically.

Incidentally, the Japanese Laid-open Patent Publication No. 55-18125 published on Feb. 8, 1980 discloses the means of generating a sampling clock by comparing the phases of burst signal and the signal after AD conversion by means of phase-locked loop circuit, and the phase-locked loop circuit (800) of the above embodiment generates the carrier signal for modulation of the reduced sub-picture signal in the similar method as in this known technique.

Thus, according to this embodiment, the same effect as in the embodiment shown in FIG. 1 may be obtained. Moreover, since the phase of the color subcarrier signal of the reduced sub-picture signal is synchronized by the phase-locked loop circuit, a synthetic composite video signal with much smaller color deviation may be obtained.

Figure 3:
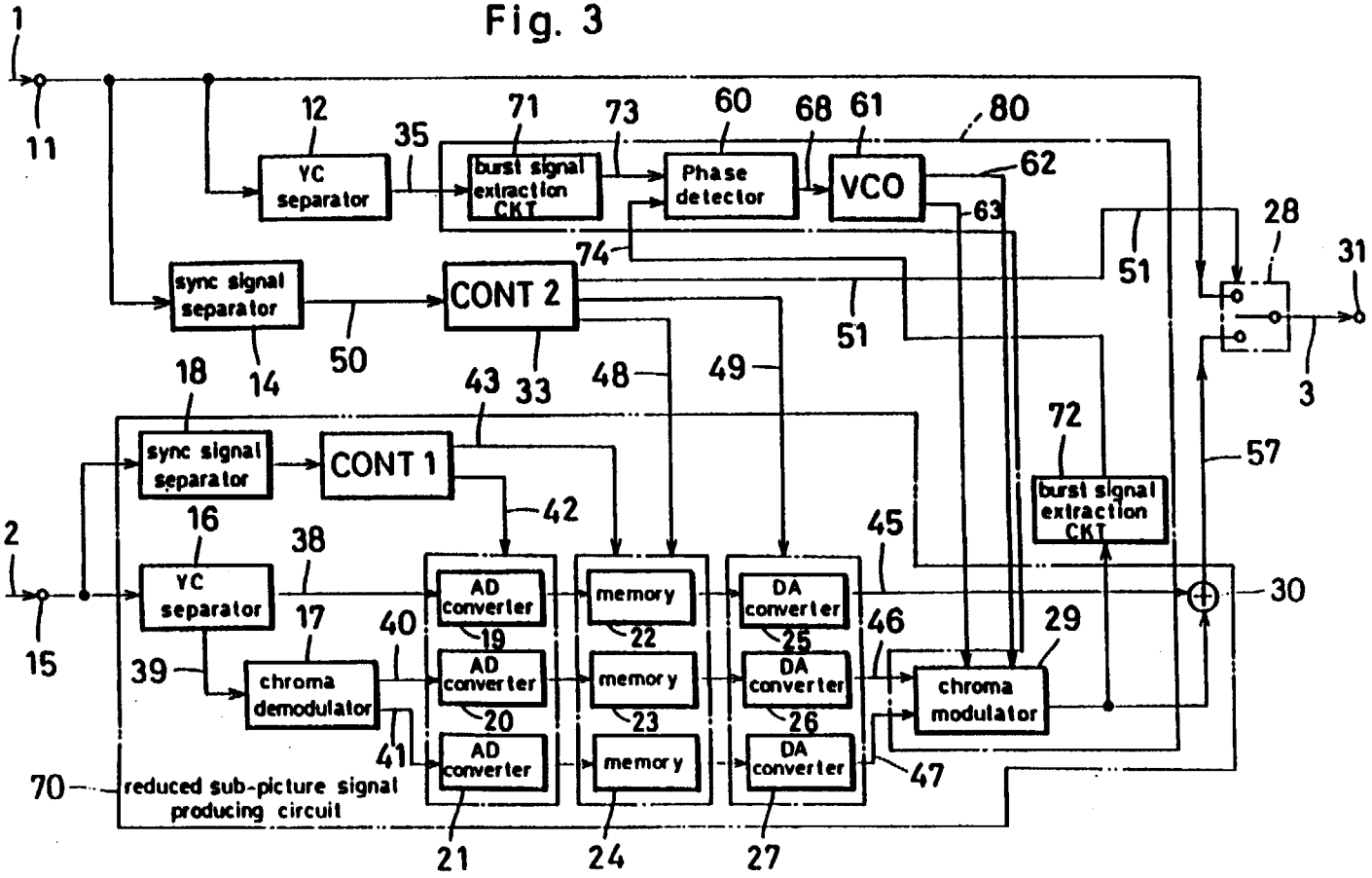

In FIG. 3, first and second burst signal extraction circuits (72), (72) are disposed in place of the first and second PLL circuits (52), (64) in the embodiment shown in FIG. 2. The phase detector (60) compares the phases of the first and second burst signals (73), (74), and generates a voltage signal (68) based on the phase difference of the two. The VCO (61) generates continuous first and second carrier signals (62), (63) being controlled in the direction of the oscillation frequency and phase approaching the first burst signal (73) by the voltage signal (68), and having a mutual phase difference of 90 degrees.

Thus, according to this embodiment, the same effect as in the embodiment shown in FIG. 2 may be obtained.

Figure 4:
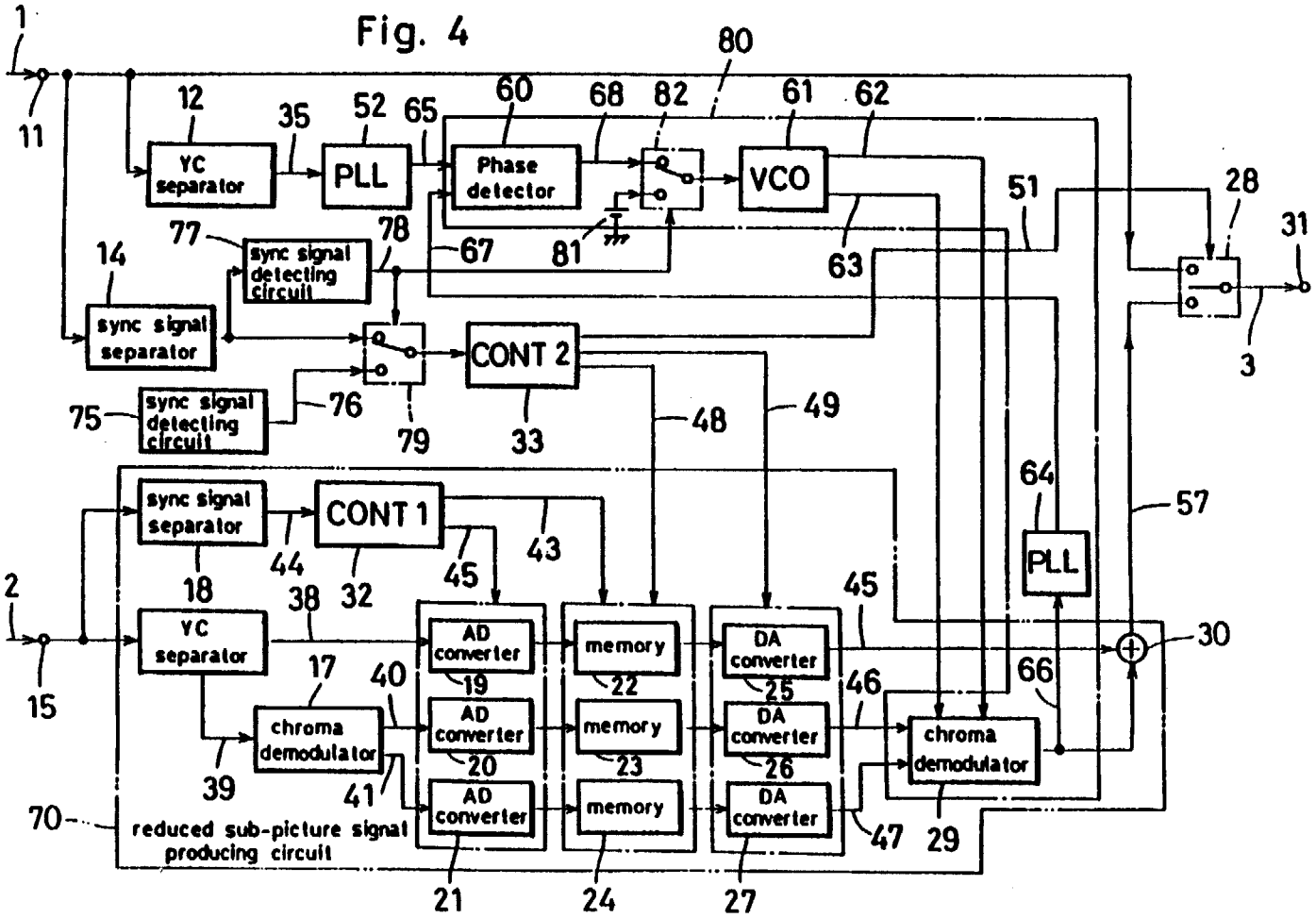
FIG. 4 is a block diagram showing another embodiment of this invention intended to deliver a reduced sub-picture signal when the main picture signal is missing.
Figure 5:
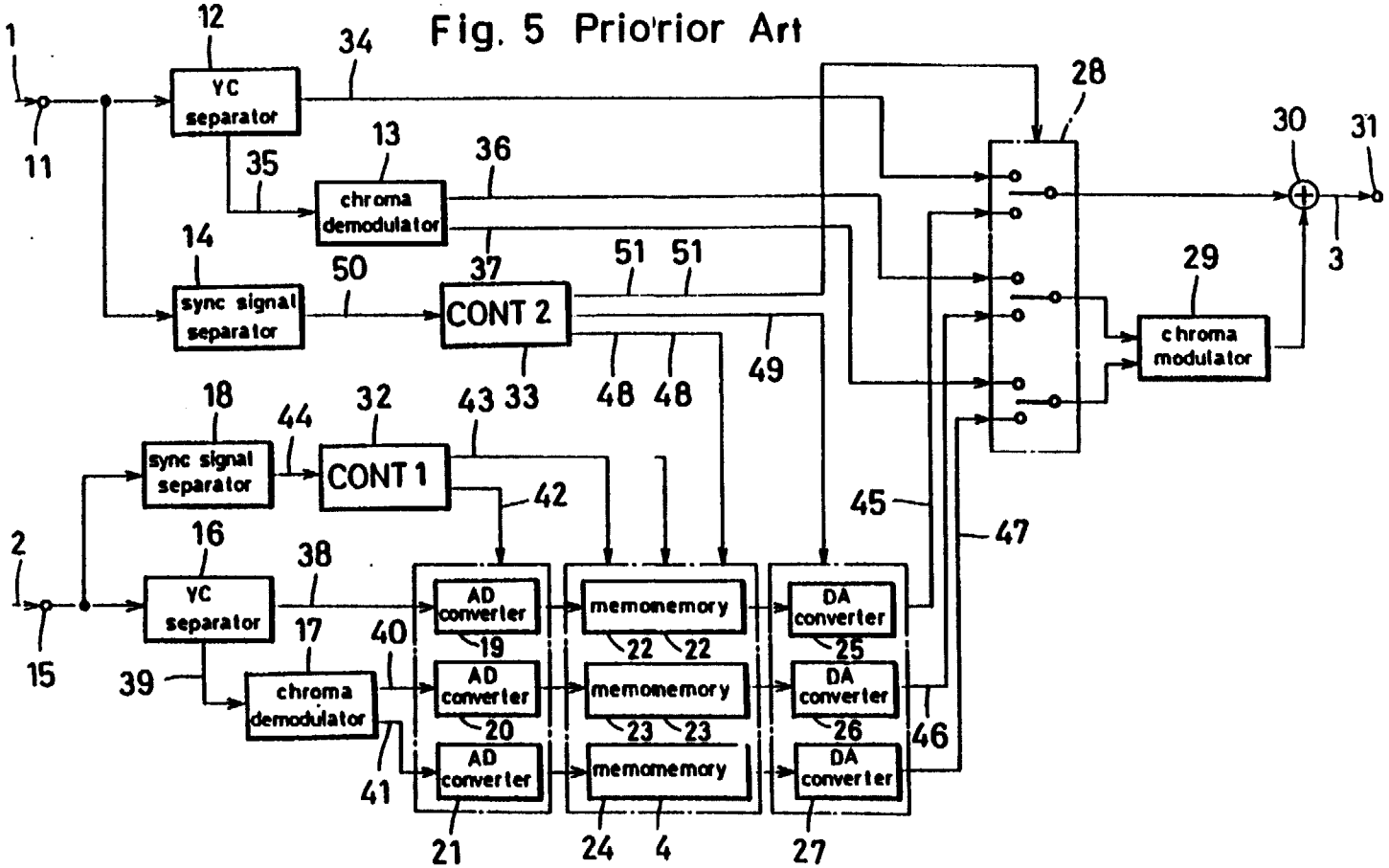
FIG. 5 is a block diagram of a conventional device for synthesizing video signal of picture-in-picture effect.

In the embodiments shown in FIG. 1 to FIG. 3, meanwhile, read-out control signals (48), (49) and changeover command signal (51) are produced by the second controller (33) on the basis of the sync signal (50) separated from the main picture signal (1). This is done while the first and second carrier signals, synchronized with the burst signal extracted from the main picture signals (1), are generated and fed into the chroma modulator (29). Therefore, if the main picture signal (1) is missing, the reduced sub-picture signal producing circuit (70) does not operate, and the reduced sub-picture signal (57) is not delivered when sub-picture signal (2) is entered. Hence, the editing job may be disturbed if editing while monitoring a main picture and sub-picture simultaneously. FIG. 4 shows a block diagram of a different embodiment of this invention intended to solve such problems, which is applied to the embodiment shown in FIG. 2.

In FIG. 4, reference numeral (75) represents a sync signal generator circuit which generates a sync signal (76) of the same type, independently from the main picture signal (1). Numeral (77) is a sync signal detecting circuit for detecting missing of the main picture signal (1) and delivering a missing signal (78). Numeral (79) is a first switch for feeding the output (76) of the sync signal generator circuit (75) into the controller (33)

when receiving the missing signal (78). Numeral (81) is an operating reference voltage source which independently delivers an operating reference voltage of the VCO (61), and (82) is a second switch for maintaining the emission of first and second carrier signals (62), (63) by feeding the set voltage of the operating reference voltage source (81) into the VCO (61) when receiving the missing signal (78).

Its operation is as follows.

The sync signal generator circuit (75) is a circuit which generates a sync signal (76) regardless of the presence or absence of main picture signal (1). The sync signal detecting circuit (77) detects the presence or absence of a sync signal (50) contained in the main picture signal (1), that is, the presence or absence of a main picture signal (1), and delivers a missing signal (78) by a binary signal. Assuming now that the main picture signal (1) is missing, the first and second switches (790 and (82) are connected opposite to the ordinary side shown in the drawing by receiving the missing signal (78), thereby changing automatically so that the sync signal (76) from the sync signal generator circuit (75) may be fed into the controller (33) and the operating reference voltage to the VCO (61). Therefore, the reduced sub-picture signal (57) is delivered from the output terminal (31) without being interrupted, so that the reduced sub-picture may be monitored continuously.

Incidentally, when the sync signal generator circuit (75), sync signal detecting circuit (77), first and second switches (79), (82), and operating reference voltage source (81) in FIG. 4 are added to the embodiment shown in FIG. 3, the sub-picture may be continuously monitored if the main picture signal (1) is missing, similar to the case of the apparatus shown in FIG. 4.

Figure 6:
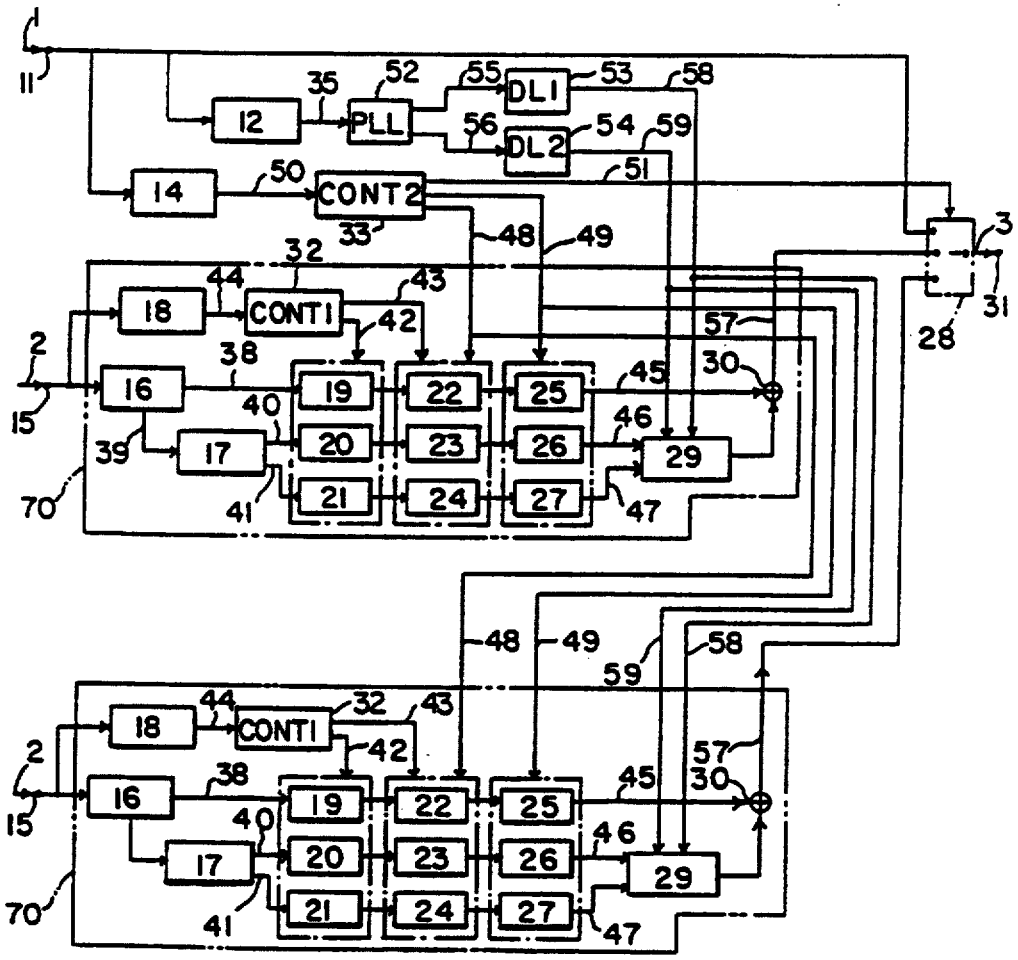
FIG. 6 is another embodiment of a block diagram showing plural reduced picture-in-picture effects.

Although the present invention has been fully described with reference to the accompanying drawings in connection with the preferred embodiments thereof taken only for the purpose of illustration, various changes and modifications can be readily conceived by those skilled in the art upon the reading of the disclosure herein described. By way of example, although in the foregoing embodiment reference has been made to the reproduction on the cathode ray tube display of only one sub-picture within the framework of the main picture, arrangement can be made to enable two or more sub-pictures to be reproduced within the framework of the main picture. This can be accomplished if the reduced sub-picture signal producing circuit (70) is used in a number equal to the number of sub-pictures, see FIG. 6 for example; the first and second carrier signals are used commonly in the individual reduced sub-picture signal producing circuits; and the input terminals of the analog switch (28) are used to equal the number of pictures.

What is claimed is:

1. A video signal synthesizer for producing a synthetic composite video signal which reproduces a main picture on a screen of a display device and a reduced sub-picture within the framework of and in a superimposed relationship with the main picture on the same screen by synthesizing a first composite video signal reproducing the main picture, a second composite video signal reproducing the sub-picture and a third composite video signal obtained by reducing said second composite video signal, comprising:

phase-locked loop means for generating first and second carrier signals;

extracting means for extracting a color burst signal from the first composite video signal, wherein the color burst signal and the first composite video signal have a mutual phase difference of 90 degrees;

synchronizing means for synchronizing the color burst signal with the first and second carrier signals;

first and second delay means for delaying the first and second carrier signals by predetermined quantities respectively;

separating means for separating the second composite video signal into a luminance signal, a red color difference signal, and a blue color difference signal, means for time-compressing the luminance signal, the red color difference signal, and the blue color difference signal;

reduced sub-picture signal producing means for producing the third composite signal from the time-compressed luminance signal, the red color difference signal, and the blue color difference signal, comprising, chroma modulating means for chroma modulating the time-compressed red color difference signal and the time-compressed blue color difference signal by the delayed first and second carrier signals to obtain a color subcarrier signal, and adding means for adding the time-compressed luminance signal to the color subcarrier signal to produce the third composite under signal, and time-division multiplexing means for time-division multiplexing the first composite video signal and the third composite video signal to thereby deliver said synthetic composite video signal;

whereby the delay-time of the first and second delay means is set such that the color subcarrier signal of the first composite video signal and the color subcarrier signal of third composite video signal may be matched in phase in accordance with the set delay time of the first and second delay means.

2. A video signal synthesizer as claimed in claim 1, which further comprises plural reduced sub-picture signal producing means for receiving the first and second carrier signals as carrier signals for chroma modulation, and wherein the time-division multiplexing means multiplexes plural third composite video signals and the first composite video signals delivered from the plural reduced sub-picture signal producing means.

3. A video signal synthesizer for producing a synthetic composite video signal which reproduces a main picture on a screen of a display device and a reduced sub-picture within the framework of and in a superimposed relationship with the main picture on the same screen by synthesizing a first composite video signal reproducing the main picture, a second composite video signal reproducing the sub-picture and a third composite video signal obtained by reducing said second composite video signal, comprising:

phase-locked loop means for generating a first continuous wave signal;

extracting means for extracting a color burst signal from the first composite video signal;

synchronizing means for synchronizing the color burst signal with the first continuous wave signal;

separating means for separating the second composite video signal into a luminance signal, a red color difference signal, and a blue color difference signal, means for time-compressing the luminance signal, the red color difference signal, and the blue color difference signal;

reduced sub-picture signal producing means for producing the third composite signal from the time-compressed luminance signal, the red color difference signal, and the blue color difference signal, comprising chroma modulating means for chroma modulating the time-compressed red color difference signal and the time-compressed blue color difference signal by first and second carrier signals having a mutual phase difference of 90 degrees, and adding means for adding the time-compressed luminance signal to a color subcarrier signal to produce the third composite video signal;

second phase-locked loop means for generating a second continuous wave signal synchronized with a color burst signal extracted from the color subcarrier signal.

phase detector means for comparing the phase of the first and second continuous wave signals and delivering a phase difference signal corresponding to the phase difference thereof;

carrier signal generating means for generating first and second carrier signals have a mutual phase difference of 90 degrees being controlled by said phase difference signal and synchronized with the phase of said first continuous wave signal, wherein the chroma modulating means utilizes the first and second carrier signals generated in the carrier signal generating means as the first and second carrier signals for chroma modulation of the reduced sub-picture producing signal; and time-division multiplexing means for time-division multiplexing the first composite video signal and the third composite video signal to thereby deliver said synthetic composite video signal.

4. A video signal synthesizer as claimed in claim 3, which further comprises plural reduced sub-picture signal producing means for receiving the first and second carrier signals as carrier signals for chroma modulation, and wherein the time-division multiplexing means multiplexes plural third composite video signals and the first composite video signals delivered from the plural reduced sub-picture signal producing means.

5. A video signal synthesizer as claimed in claim 3, which further comprises:

sync signal generator means for generating a sync signal corresponding to the sync signal of the first composite video signal;

operating reference voltage source means for delivering an operating reference voltage of the carrier signal generating means consisting of a voltage-controlled oscillator;

control means responsive to the sync signal for delivering control signals to control the multiplexing means and the reduced sub-picture signal producing means in synchronism with the first composite video signal;

means for delivering a missing signal when an absence of the first composite video signal is detected;

first switching means for maintaining the control signals delivered from said control means by selectively feeding the sync signal of the first composite video signal or the sync signal delivered from the sync signal generator means to said control means, the latter sync signal being fed when the missing signal is received;

and second switching means for maintaining the generation of the first and second carrier signals by selectively feeding the phase difference signal delivered from the phase detector means or the operating reference voltage to the voltage-controlled oscillator, the operating reference voltage being fed when the missing signal is received.

6. A video signal synthesizer for producing a synthetic composite video signal which reproduces a main picture on a screen of a display device and a reduced sub-picture within the framework of and in a superimposed relationship with the main picture on the same screen by synthesizing a first composite video signal reproducing the main picture, a second composite video signal reproducing the sub-picture and a third composite video signal obtained by reducing said second composite video signal, comprising:

a carrier signal generating means for generating first and second carrier signals having a mutual phase difference of 90 degrees, synchronizing means for synchronizing the color burst signal with the first and second carrier signals;

first and second delay means for delaying the first and second carrier signals by predetermined quantities respectively;

separating means for separating the second composite video signal into a luminance signal, a red color difference signal, and the blue color difference signal;

means for time-compressing the luminance signal, the time-compressed red color difference signal and the time-compressed blue color difference signal by the delayed first and second carrier signals to obtain a color subcarrier signal;

adding means for the time-compressed luminance signal to the color subcarrier signal to produce the third composite video signal;

reduced sub-picture signal producing means for producing the third composite video signal from the time-compressed luminance signal, the red color difference signal, and the blue color difference signal wherein the chroma modulating means utilizes the first and second carrier signals generated in the carrier signal generating means as the delayed first and second carrier signals for chroma modulation of the reduced sub-picture producing signal;

first and second color burst signal extraction means for extracting color burst signals from the first composite video signal and the third composite video signal respectively;

phase detector means for comparing the phase of the color burst signal extracted from the first composite video signal by the first color burst signal extraction means with the phase of the color burst signal extracted from the third composite video signal by the second color burst signal extraction means, and delivering a phase difference signal corresponding to the phase difference thereof; said carrier signal generating means controlling the phase difference of said first and second carrier signals by utilizing the phase difference signal;

said synchronizing means synchronizing the phase of the first color burst signal with the phase difference; and time-division multiplexing means for time-division multiplexing the first composite video signal and the third composite video signal to thereby deliver said synthetic composite video signal.

7. A video signal synthesizer as claimed in claim 6, which further comprises plural reduced sub-picture signal producing means for receiving the first and second carrier signals as carrier signals for chroma modulation, and wherein the time-division multiplexing means multiplexes plural third composite video signals and the first composite video signals delivered from the plural reduced sub-picture signal producing means.

8. A video signal synthesizer as claimed in claim 6, which further comprises:

sync signal generator means for generating a sync signal corresponding to the sync signal of the first composite video signal;

operating reference voltage source means for delivering an operating reference voltage of the carrier signal generating means consisting of a voltage-controlled oscillator;

control means responsive to the sync signal for delivering control signals to control the multiplexing means and the reduced sub-picture signal producing means in synchronism with the first composite video signal;

means for delivering a missing signal when an absence of the first composite video signal is detected;

first switching means for maintaining the control signals delivered from said control means by selectively feeding the sync signal of the first composite video signal or the sync signal delivered from the sync signal generator means to said control means, the latter sync signal being fed when the missing signal is received;

and second switching means for maintaining the generation of the first and second carrier signals by selectively feeding the phase difference signal delivered from the phase detector means or the operating reference voltage to the voltage-controlled oscillator, the operating reference voltage being fed when the missing signal is received.

*9. A video signal synthesizer for producing a synthetic composite video signal which reproduces a main picture on a screen of a display device and a reduced sub-picture within the framework of and in a superimposed relationship with the main picture on the same screen by synthesizing a first composite video signal reproducing the main picture and a third composite video signal reproducing the sub-picture obtained by reducing a second composite video signal, comprising;*

*synchronizing means for synchronizing a color subcarrier signal of the third composite video signal with a color subcarrier signal of the first composite video signal in phase;*

*separating means for separating the second composite video signal into a luminance signal, a red color difference signal, and a blue color difference signal;*

*means for time-compressing the luminance signal, the red color difference signal, and the blue color difference signal;*

*reduced sub-picture signal producing means for producing the third composite signal from the time-compressed luminance signal, the time-compressed red color difference signal and the time-compressed blue color difference signal, comprising,*

*chroma modulating means for chroma modulating the time-compressed red color difference signal and the time-compressed blue color difference signal to provide the color subcarrier signal of the third composite video signal, and*

*adding means for adding the time-compressed luminance signal to the color subcarrier signal to produce the third composite video signal; and*

*time-division multiplexing means for time-division multiplexing the first composite video signal and the third composite video signal to thereby deliver said synthetic composite video signal.*

*10. A picture-in-picture circuit comprising:*

*a sub-picture demodulator demodulating a desired sub-picture signal to produce sub-picture component signals, said sub-picture component signals including separated luminance and chrominance sub-picture signal portions;*

*a memory for storing said luminance and chrominance sub-picture signal portions in first and second memory areas;*

*a synchronization signal generator for generating a first synchronization signal from a main picture signal;*

*a color synchronizer generating at least one color sub-picture synchronization signal synchronized to said main picture color subcarrier signal but delayed with respect thereto;*

*a reader reading the output of said memory under control of said synchronization signal to thereby develop a synchronized sub-picture signal synchronized to said main picture signal; and*

*a chrominance modulator for modulating said separated chrominance sub-picture portion to produce a sub-picture color subcarrier signal synchronized to said main picture color subcarrier signal under control of said at least one color sub-picture synchronization signal.*

*11. The picture-in-picture circuit of claim 10 wherein said sub-picture demodulator further demodulates said chrominance sub-picture portions into red and blue color difference signals.*

*12. The picture-in-picture circuit of claim 11 wherein said synchronization signal generator further includes a synchronization signal separator receiving said main picture signal and separating a main synchronization signal therefrom to form said first synchronization signal.*

*13. The picture-in-picture circuit of claim 10 further comprising an analog switch for time division multiplexing said synchronized sub-picture signal with said main picture signal to produce picture-in-picture.*

*14. The picture-in-picture circuit of claim 10 wherein said color synchronizer includes,*

*a main picture Y-C separator producing a main color subcarrier signal,*

*a phase lock loop connected to the output of said main Y-C separator, synchronized in phase therewith and developing first and second carrier signals separated in phase by 90 degrees, and*

*first and second time delays connected to the phase locked loop and receiving said first and second carrier signals, said first and second time delays delaying said first and second carrier signals to produce first and second color sub-picture synchronization signals.*

*15. The picture-in-picture circuit of claim 10 wherein said color synchronizer includes,*

*a main picture Y-C separator producing a main color subcarrier signal,*

*a first phase lock loop connected to said main Y-C separator and locking to the phase of said main color subcarrier signal,*

*a second phase lock loop connected to the output of said chrominance modulator and mocking to the phase of said sub-*pi picture color subcarrier signal,

*a phase detector for determining the phase difference between said main color subcarrier signal and said sub-picture color subcarrier signal, and*

*a voltage controlled oscillator responsive to the phase difference determined by said phase detector and producing first and second phase shift signals as first and second color sub-picture synchronization signals.*

*16. The picture-in-picture circuit of claim 10 wherein said color synchronizer includes,*

*a main picture Y-C separator producing a main color subcarrier signal,*

*a main picture burst signal extraction circuit extracting a main burst signal from the main color subcarrier signal,*

*a sub-picture burst signal extracting circuit extracting the sub-picture burst signal from the sub-picture color subcarrier signal,*

*a phase detector for determining the phase difference between said main burst signal and said sub-picture burst signal, and*

*a voltage controlled oscillator responsive to the phase difference determined by said phase detector and producing first and second phase shift signals as first and second color sub-picture synchronization signals.*

*17. The picture-in-picture circuit of claim 15 wherein said synchronization signal generator includes,*

*a synchronization signal separator receiving said main picture signal and separating a main synchronization signal therefrom to form a memory synchronization signal;*

*an independent synchronization signal generator generating a synchronization signal independent of any picture signal,*

*missing synchronization signal detector for determining if the main picture signal is missing a main synchronization signal and producing a missing signal indicative thereof,*

*first means, responsive to receipt of said missing signal from said missing synchronization signal detector, for supplying said synchronization signal from said independent synchronization signal generator as said memory synchronization signal, said reader reading the output of said memory under control of said memory synchronization signal, and*

*second means, responsive to receipt of said missing signal from said missing synchronization signal detector, for supplying a voltage indicative of a reference phase difference to said voltage controlled oscillator,*

*said first and second means, when responsive to receipt of a missing signal allowing the sub-picture to be generated in the absence of a main picture.*

* * * * *